(12) United States Patent
Wray

(10) Patent No.: US 11,849,515 B2
(45) Date of Patent: Dec. 19, 2023

(54) LIGHTING SYSTEM WITH REDUNDANT POWER SUPPLIES

(71) Applicant: USAI, LLC, New Windsor, NY (US)

(72) Inventor: Donald L. Wray, Ocala, FL (US)

(73) Assignee: USAI, LLC, New Windsor, NY (US)

( * ) Notice: Subject to any disclaimer, the term of this patent is extended or adjusted under 35 U.S.C. 154(b) by 157 days.

(21) Appl. No.: 17/201,880

(22) Filed: Mar. 15, 2021

(65) Prior Publication Data

US 2021/0289601 A1 Sep. 16, 2021

Related U.S. Application Data

(60) Provisional application No. 62/989,133, filed on Mar. 13, 2020.

(51) Int. Cl.
*H05B 45/30* (2020.01)
*H05B 45/34* (2020.01)
*H02J 9/06* (2006.01)

(52) U.S. Cl.
CPC .............. *H05B 45/34* (2020.01); *H02J 9/061* (2013.01); *H02J 9/068* (2020.01)

(58) Field of Classification Search
CPC .... H02J 9/068; H02J 9/061; H02J 9/06; H02J 9/00; H02J 9/04; H05B 45/00; H05B 45/34; H05B 47/105; H05B 47/18
See application file for complete search history.

(56) References Cited

U.S. PATENT DOCUMENTS

| | | | |
|---|---|---|---|
| 10,485,073 B1* | 11/2019 | Hsia | H02M 3/33561 |
| 2015/0214785 A1* | 7/2015 | Jagjitpati | H02J 9/065 |
| | | | 307/66 |
| 2018/0249556 A1* | 8/2018 | Wendt | H04L 12/12 |

FOREIGN PATENT DOCUMENTS

| | | | | |
|---|---|---|---|---|
| GB | 2541470 A | * | 2/2017 | H02J 9/06 |
| WO | WO-2014030062 A2 | * | 2/2014 | H02J 7/0072 |

* cited by examiner

*Primary Examiner* — Henry Luong
(74) *Attorney, Agent, or Firm* — ST. ONGE STEWARD JOHNSTON & REENS LLC

(57) ABSTRACT

A low voltage power distribution system that provides low voltage DC power to LED light fixtures and provides for backup or redundant power in the event of a failure of the one of the primary power supplies feeding the output channels to the respective LED light fixtures. The system allows for the automatic switching out of a failed power supply and the switching in of a spare power supply to minimize any down time for a output channel in the event of a primary power supply failure.

13 Claims, 1 Drawing Sheet

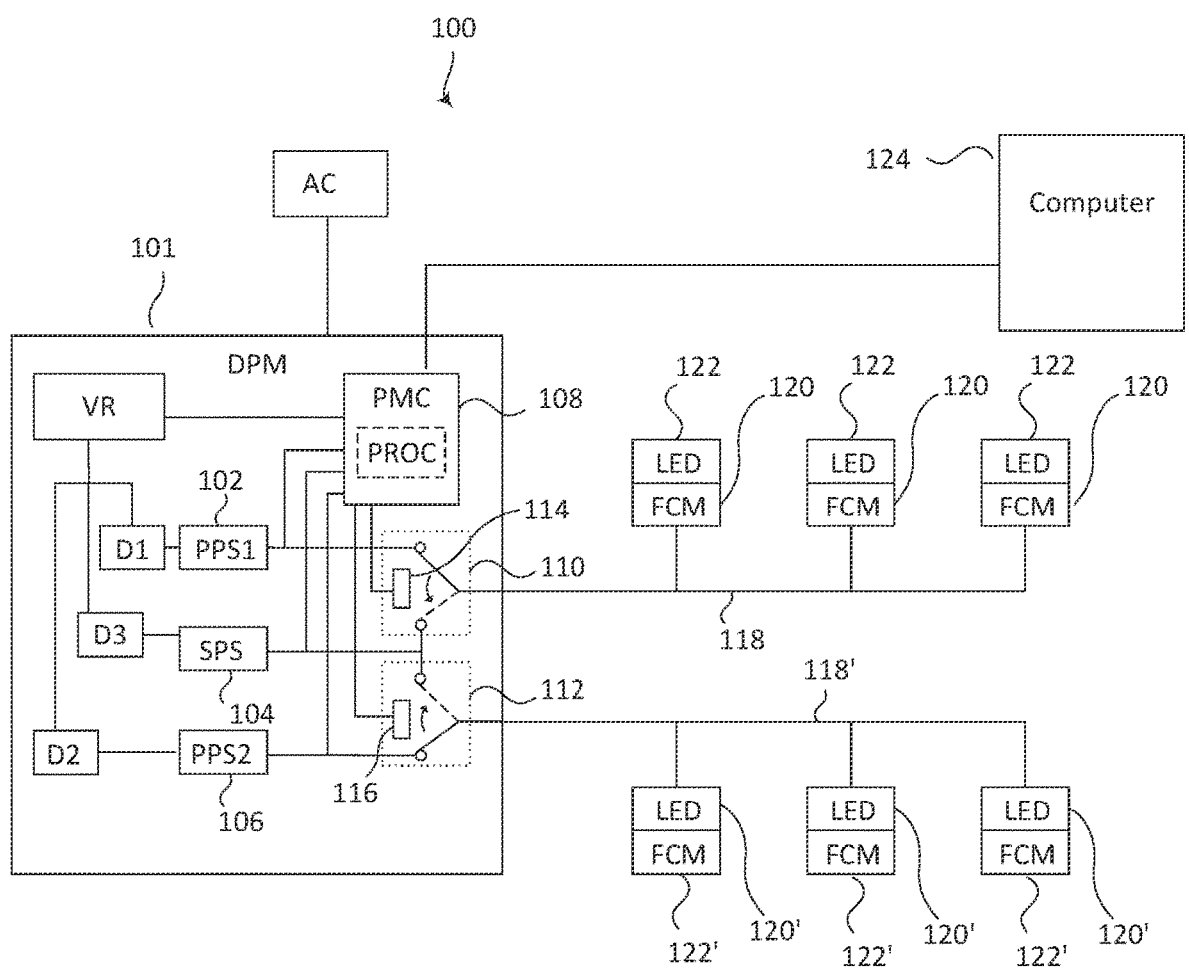

LIGHTING SYSTEM WITH REDUNDANT POWER SUPPLIES

FIELD OF THE INVENTION

The invention relates to a distributed lighting system and, more specifically, to a system and method for providing redundant or backup power for a distributed lighting system and method.

BACKGROUND OF THE INVENTION

Distributed lighting systems typically have a central controller and have distributed/remote light fixtures connected to and controlled by the central controller, whereby the central controller receives power from a power source and receives control signals from one or more control inputs, and, in turn, provides power and control signals to the light fixtures. For example, multiple Light Emitting Diode (LED) light fixtures can be connected to central controller by low voltage wiring, which provides both power and control to the LED light fixtures. LED light fixtures provide many advantages over traditional incandescent and fluorescent lighting systems as they use much less power, provide a high lumen output, allow for precise lumen output control, allow for color variance and have a very long life.

However, there are some disadvantages associated with these types of systems including, for example, they utilize power supplies that convert higher voltage (e.g., 120V AC) to a lower voltage (e.g., 48V DC), which power supplies are subject to failure. If a power supply fails, the lights that are connected to that power supply will not be operational. There are several reasons that a power supply could fail including, for example, power surges, equipment age, manufacturing flaws and improper repairs. While the equipment that supplies power to LED light fixtures continues to improve in quality, these uncontrollable external factors continue to be an issue that can render all the lights connected to the particular power supply output inoperable.

SUMMARY OF THE INVENTION

What is needed then is a system and method that allows for continued operation of LED light fixtures supplied with low voltage power (48V DC) in the event of a failure of a power supply.

It is further desired to provide a system and method for automatically compensating for a failed power supply connected to LED light fixtures.

It is still further desired to provide a system and method for automatically disconnecting a failed power supply from a supply line to LED light fixtures.

A distributed lighting system may include a central controller, a Digital Power Module (DPM), which is coupled to at least one remote/distributed Fixture Control Module (FCM) that controls an associated light fixture (e.g., an LED light fixture). The DPM may comprise a plurality of lighting channels/output ports, each of which may be connected to a plurality of FCMs. The DPM can include an Alternating Current (AC) input (e.g., 120V/277V), and a direct current (DC) output from a power supply (e.g., 48V) for each lighting channel. DPM's may, in one embodiment, comprise up to four different lighting channels. A channel comprises an output on which multiple LED light fixtures may be connected such that power and/or control data is provided to the fixtures connected to the channel.

In one configuration, DC power is transmitted to the FCMs via low-voltage wiring, such as class 2 wiring, which in one embodiment may comprise but is not limited to CAT 5/6/6E cabling. It is contemplated that the FCMs can be connected to the low voltage wiring in parallel, such as, in a daisy chain configuration. In this manner, a failure of any single FCM (e.g., the FCM typically fail open) would not adversely affect the operation of the remaining FCMs (and therefore the other LED light fixtures) connected to the low voltage wiring. The DPM also provides control signals to the FCMs, such as digital control signals (e.g., DMX), via the low-voltage wiring. Alternatively, the digital control signals could be transmitted to the FCMs wirelessly. The control signals may, in one configuration, include data addresses and the FCMs are configured to receive control signals based on pre-set and/or user-selectable addresses. For example, multiple LED light fixtures may be connected to a channel to receive common power and each of the light fixtures on a channel may also receive control. In one configuration, such as with CAT 5/5E/6, four pairs of wires are provided where three of the pairs are connected in parallel for transmitting power to the LED light fixtures connected to the channel and one pair of wires is used to provide control to the LED light fixture connected to the channel. However, will be understood by those of skill in the art that individual light fixtures may receive individual controls via DMX the wires transmitting control information to all of the light fixtures on the channel.

The DPM may also be configured to receive several analog 0-10V inputs in addition to digital inputs. The 0-10V inputs on the DPM may originate from a dimmer switch (such as a wall-mounted slide-type dimmer), or from a daylight sensor, or from an occupancy sensor, or the like. It will be understood by those of skill in the art that occupancy sensors are typically Open/Closed contact inputs.

The DPM may include a control module having a processor (e.g., a Microprocessor, a Field Programmable Gate Array, a Digital Signal Processor, a Microcontroller or the like) and transmitter/transceiver for processing control inputs and for transmitting control signals to the FCM(s), for example via the low voltage wiring and/or wirelessly. Each FCM may be operable to receive the control signal(s) transmitted from the DPM being operable to control drivers that correspond to the various color channels of the LED lighting fixture. In one configuration, these may include pulse-width modulation (PWM) and/or other control formats and techniques. The FCMs may be provided with a receiver/transceiver and processor for receiving and processing the control signals and for controlling the drivers. The FCMs may also be operable to transmit information and/or control signals to the DPM in the same manner. For example, the FCM could provide a feedback signal(s) indicating operation of the associated LED light fixture, duration of operation of the LED light fixture, duration of the individual components, magnitude of the operation for each of the color LEDs, indication of failure of a component of the LED light fixture or the FCM, trouble-shooting information, a re-start required signal or other information.

The DPM includes a plurality of output ports for a plurality of lighting channels (e.g., 4 ports/4 channels). In one configuration, the DPM includes one dedicated power supply for each output port (i.e., a primary power supply), and the DPM may include a spare power supply that may be switched into any output port if any of the primary power supplies fails. The DPM is operable to monitor the status of all primary power supplies and the spare power supply. In the event of a failure of one of the primary power supplies, the DPM is operable to disconnect the failed power supply from the associated port and connect the spare power supply to the associated port to maintain power to the port and the associated lighting channel.

In one configuration, the redundant power scheme uses four primary power supplies (i.e., one for each channel) and one spare power supply. The spare power supply can be described as a "hot" power supply as it will be provided with power along with the four primary power supplies such that, in the event of a failure of any one of the primary power supplies, the failed primary supply can be switched out and the spare may be automatically switched in with little to no interruption in the functioning of the LED light fixtures.

In this configuration, four electro-mechanical Single-Pole Double-Throw (SPDT) relays are used with normally-closed contacts such that in the "off" state the primary power supplies are connected to the outputs of each their associated output ports (e.g., ports 1-4).

The output of the spare power supply's is connected to the other pole of the relay (e.g., the normally-open contact) of each of the four relays such that, if any one of the four relays is activated, the primary power supply on that channel is switched out and that channel is automatically connected to the spare power supply output.

For this application the following terms and definitions shall apply:

The term "network" as used herein includes both networks and internetworks of all kinds, including the Internet, and is not limited to any particular type of network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

In one configuration, a power supply system for low voltage lighting comprising a digital power module including a power input adapted to receive an AC voltage, and a power output channel adapted to transmit a DC voltage. The digital power module further includes a primary power supply having an output adapted to generate a DC voltage, a spare power supply having an output adapted to generate a DC voltage, and a power transfer switch having a control input and a set of contacts, the contacts coupled to the output of the primary power supply, the output of the spare power supply and the power output channel. The system is provided such that when power is variously provided to the control input of the power transfer switch, the set of contacts function to switch between: connecting the output of the primary power supply to the power output channel, and connecting the output of the spare power supply to the power output channel.

In another configuration, a method for providing power for a low voltage lighting system is provided, the method comprising the steps of connecting an AC voltage to a power input of a digital power module, generating a DC voltage with a primary power supply, and generating a DC voltage with a spare power supply. The method further comprises the steps of connecting the DC voltage generated by the primary power supply to a first contact of a power transfer switch, connecting the DC voltage generated by the spare power supply to a second contact of the power transfer switch, and connecting a common contact of the power transfer switch to an output channel. The method is provided such that when power is variously provided to the control input of the power transfer switch, the set of contacts function to switch the contacts as follows: actuating the power transfer switch to close between the primary power supply and the output channel, and actuating the power transfer switch to close between the spare power supply and the output channel.

Other objects of the invention and its features and advantages will become more apparent from consideration of the following drawings and accompanying detailed description.

BRIEF DESCRIPTION OF THE DRAWINGS

FIG. 1 is a block diagram of a configuration of the invention.

DETAILED DESCRIPTION OF THE INVENTION

The following examples are presented to further illustrate and explain the present invention and should not be taken as limiting in any regard. Likewise, the illustrations and drawings are not provided to scale and are provided to further explain and illustrate the novel features of the invention.

The system includes a Digital Power Module (DPM) which may be provided with a plurality of Primary Power Supplies (e.g., PS #1-PS #4) each of which are adapted to receive power from a main power source (e.g., 120V/277V AC) and are adapted to provide power (e.g., 48V DC) to an associated Output Port (e.g., Port #1-Port #4). The DPM may further include a Spare Power Supply (e.g., PS #5). The DPM is provided with circuitry to monitor the status of the Primary Power Supplies and the Spare Power Supply via a Power Fault Detector Port 1-4 and a Spare Power Failure Detect, via a Processor.

In the event of a failure of one of the Primary Power Supplies PS1-PS4, the DPM is operable to disconnect the identified failed Primary Power Supply from the associated Output Port and to connect the Spare Power Supply to the port. The switching is done by a plurality of electronic power transfer switches, with one power transfer switch disposed between each of the Primary Power Supplies and the associated Output Port. The Spare Power Supply is adapted to be connected to each power transfer switch. Each electronic switch may be provided as a single-pole-double-throw (SPDT) switch operable to connect either the Primary Power Supply or the Spare Power Supply to the associated Output Port, but not both simultaneously. (See dotted section 1).

An inverter is associated with each power transfer switch and is provided to control the function of the power transfer switch. The processor is coupled to and controls each inverter.

Each power transfer switch can include, for each Primary Power Supply, a primary transistor and a primary Field Effect Transistor (FET) as well as a spare transistor and a spare FET. If, for example, a Primary Power Supply is functioning properly, the primary transistor will bias the primary FET to a closed position and the spare transistor will bias the spare FET to an open position. This is controlled by the processor, which could comprise a PIC24FJ256GA705. If, however, the processor determines that the Primary Power Supply is not functioning properly, the processor will cause the primary transistor to bias the primary FET open and cause the spare transistor to bias the spare FET closed. In this manner, any of the four Primary Power Supplies can be isolated and the Spare Power Supply can be used in its place. While the various power circuits and FETS can be driven by a series of components including, transistors, Zener diodes and resistors, it is contemplated that equivalent function could be provided by various devices including, but not limited to: a digital signal processor, a field-programmable gate array, an application-specific integrated circuit, a micro-processor, a micro-controller, or any other form of programmable hardware.

Each power transfer switch can comprise a first primary FET and a second primary FET for the primary (channel 1) power supply where each of the FETs are driven by a primary transistor, as well as a first spare FET and a second spare FET for the spare (backup) power supply where each of the FETs are driven by a spare transistor. The primary transistor is driven by a Channel 1 Logic 1 signal from the processor, whereas the spare transistor is also driven by the Channel 1 Logic 0 signal due to the fact that it passes through a NOT Gate. With additional circuitry (e.g., "Channel N"), any number of additional channels may effectively be used. For example, while four primary channels and one backup or spare channel may be employed, it will be understood by those of skill in the art that a fewer or greater number of primary channels may be used and a fewer or greater number of spare channels may be provided.

This configuration ensures that the deselected power supply is fully electrically disconnected from the associated Output Port when not selected.

Under normal operation, or at startup, the processor will enable all the Primary Power Supplies and will maintain the Spare Power Supply off-line (but powered on). The processor continuously monitors the status of the Primary Power Supplies and the Spare Power Supply to ensure that they have the required output (e.g., 48V).

If a single Primary Power Supply fails, and if the Spare Power Supply is functioning properly, the DPM will cause the power transfer switch associated with the failed Primary Power Supply to connect the Spare Power Supply to the associated Output Port. If the Spare Power Supply has also failed, then the DPM will not cause the Spare Power Supply to be connected to the Output Port/Channel. Additionally, in one configuration, the DPM/Processor will include a logic to ensure that the Spare Power Supply is not connected to more than one Output Port simultaneously even if multiple Primary Power Supplies fail. In that case, the processor will function to connect the Spare Power Supply to the first failed Primary Power Supply and will generate and alert. An additional alert can be generated if a second Primary Power Supply fails. The alerts can include data that is transmitted to a remote computer to provide information on the exact nature of the alert and allowing personnel to bring with them replacement for the failed components.

One of skill in the art will understand that a power surge condition from a power supply can be the result of a failed or failing power supply or an overload condition on the lighting channel (e.g., too many fixtures). In the event that the DPM detects a power surge condition from a Primary Power Supply, the DPM is operable to switch to the Spare Power Supply as discussed above. The DPM is further operable such that if the power surge condition ceases, to maintain the connection to the Spare Power Supply and indicate a failure of the Primary Power Supply. However, if the power surge condition remains during the connection to the Spare Power Supply, the DPM is operable to switch back to the Primary Power Supply and indicate an overload condition on the associated Output Port.

It is further contemplated that the DPM may be operable to indicate normal power conditions and various failure conditions by operation of indicator lights controlled by the Processor. For example, the DPM may indicate a properly operating Primary Power Supply by steady illumination of an LED (e.g., green) corresponding to its associated Output Port, and failure by flashing the LED or providing for illumination of a different LED (e.g., red). The DPM may be operable to indicate use of the Spare Power Supply by illumination with an LED (e.g., yellow) corresponding to the connected port. The DPM may also indicate failure of the Spare Power Supply by an associated indicator light. Along with the direct visual indications that may be provided, it is contemplated that various information may be provided to a remote computer providing information about the various alerts and/or failures of the devices.

The Primary Power Supplies and the Spare Power Supplies are preferably designed to be easily removed and replaced in the DPM such as with a modular slide-in design. Maintenance personnel receiving specific information about the particular alert/failure, can gather the needed materials prior to visiting the site of the DPM to ensure that all materials are on hand to fix the device in one trip.

It is further contemplated that the Primary Power Supplies allow for redundant power to the Processor and other components of the DPM. (Redundant Internal Control Power). In the event that one of the Primary Power Supplies fails, the systems is designed so that control power to the voltage regulator is provided by another Primary Power Supply such that the system continues to function from a control standpoint even if all but one (e.g., four of the five) power supplies fail. This ensures that detailed information can be transmitted to the remote computer to provide maintenance personnel with as much information as possible prior to visiting the DPM for repair or replacement.

Referring to FIG. 1, the system can have a DPM 101 which may include a plurality of Primary Power Supplies 102, 106 (e.g., PPS #1-PPS #2) each of which are adapted to receive power from a main power source (e.g., 120V/277V AC), which are connected to and provide power (e.g., 48V DC) to an associated Output Port 118, 118' (e.g., Port #1-Port #2). The DPM further includes a Spare Power Supply 104 (SPS). The DPM monitors the status of the Primary Power Supplies and the Spare Power Supply via voltage sense lines to a Processor (PROC).

In the event of a failure of one of the Primary Power Supplies, the DPM is operable to disconnect the failed Primary Power Supply from the associated Output Port and to connect the Spare Power Supply to the associated port. The power transfer switches can accomplish the switching by, for example, employing a plurality of electro-mechanical relays, with the associated relay contacts disposed between each of the Primary Power Supplies and the associated Output Port respectively. The Spare Power Supply is connected to the contacts for each rely. Each relay can be a single-pole-double-throw (SPDT) switch such that the relay is operable to connect either the Primary Power Supply or the Spare Power Supply to the associated Output Port.

The Single-Pole Double-Throw (SPDT) relays are normally-closed in an "off" state. The primary power supplies are connected to one of the contact poles (e.g., the normally-closed contact) and the spare power is connected to the other contact pole (e.g., the normally-open contact). Each of the output ports (e.g., ports 1-2) are connected to the common pole of each set of contacts associated with the output. In this way, when power to the relay is off, the primary power supply for a port connects to the associated port through the normally-closed contact. However, in the event of a power failure of a primary power supply for a port, the relay is activated and the contacts change state so that the spare power supply is connected to that port through the normally-open contact, which has since been closed. A zero-ohm resister can extend across the normally closed contact. This jumper is used for printed circuit board designs that do not utilize the redundant power unit. As such, for the configuration of the present invention, zero-ohm resistor is not utilized.

The processor is connected to a 3.3V local voltage regulator (VR) to provide power for the processor and control circuits. The processor receives power from a plurality of "ORing" diodes (e.g., D1-D3), each of which is connected to one of the power supplies. Each of the relays is also connected to the ORing diodes. In this manner, if any one of the power supplies is functional, power is supplied to the control circuits, including the 3.3V regulator, processor and relays. This functions to provided redundant control power even if all but one (e.g., four of the five) power supplies fail.

Control and monitoring of the power supplies is performed by the processor and is accomplished by using a respective number of channels of the processor's A/D converter to monitoring the functioning of each of the primary power supplies and the spare power supply. If one of the power supplies is determined to be faulty or has catastrophically failed, the processor will connect the spare power supply to the effected channel via the associated power transfer switch. It will be understood by those of skill in the art that due to the fact that the spare power supply is always on and ready to immediately switch in for a failed primary power supply, it is also susceptible to failure and therefore must also be monitored. If the spare power supply is the first supply to fail, the processor may use the monitor USB port as well as status indicator LED's to alert the identified failure of the spare power supply. Alternatively, if one of the primary power supplies has failed, the spare power supply will be switched over automatically by the processor. In this case, the status LED and the USB port will transmit an alert that a power supply has failed and will indicate which port the failed primary supply is associated with.

In the event that multiple failures of power supplies occurs, there is only one spare power supply and as such, only one port can be accommodated and kept functional. This will mean that the first primary power supply will be switched out by the spare power supply but any subsequent primary power supply failure will not be automatically backed up. However, the system will provide alerts to any power supply failure and will indicate which power supplies are in an alert status on both the status LED's and USB monitor if desired.

The system can also include power status LED's driven by the processor, A/D inputs from the power supplies to monitor supply voltages, outputs from the processor to drive the relay coils to switch the selected channel to backup, a USB port for all types of local or remote monitoring functions and other system functions.

Referring again to FIG. 1, the system 100 includes a digital power module 101 that is provided with a first primary power supply 102, a spare power supply 104, and at least a second primary power supply 106. The outputs for the various power supplies are connected to a power monitoring circuit 108, which monitors the voltage output. The power monitoring circuit comprises a processor (PROC).

The output of the first primary power supply 102 is connected to one of the switching contacts of first power transfer switch 110, and the output of the spare power supply 104 is connected to the other switching contact of the first power transfer switch 110. The common contact of the first power transfer switch 110 is connected to first output channel 118, which is used to transmit power to the various fixture control modules 120. The power monitoring circuit is also shown connected to the control input 114 of first power transfer switch 110. In one configuration, the processor could be provided to control the power provided to the control input 114 based on the sensed output power from first primary power supply 102. In this way, if the first primary power supply 102 fails or the output power drops below a threshold level, the processor can function to turn off the power to the control input 114, which would function to cause the switch arm to toggle to connect the spare power supply 104 to first output channel 118.

The output of the second primary power supply 106 is connected to one of the switching contacts of second power transfer switch 112, and the output of the spare power supply 104 is connected to the other switching contact of the second power transfer switch 112. The common contact of the second power transfer switch 112 is connected to second output channel 118', which is used to transmit power to the various fixture control modules 120'. The power monitoring circuit 108 is also shown connected to the control input 116 of the second transfer switch 112. As discussed above, the processor could be provided to control the power provided to the control input 116 based on the sensed output power from second primary power supply 106. If the second primary power supply 106 fails or the output power drops below a threshold level, the processor can function to turn off the power to the control input 116, which would function to cause the switch arm to toggle to connect the spare power supply 104 to second output channel 118'.

As the control for the various control inputs 114, 116 is controlled by the power monitoring circuit 108 including the processor (PROC), the system can ensure that if one of the primary power supplies 102, 106 fails the spare power supply 104 can be quickly switched into the output channel 118, 118' as needed. However, the system further functions to ensure that the spare power supply 104 is not connected to multiple output channels 118, 118' simultaneously. It will be further noted that the switching configuration due to the construction of the power transfers switches 110, 112 disconnects the failed primary power supply from the respective output channel. This feature ensures that if the failed primary power supply were to short out, such event would not negatively impact the respective output channel when the spare power supply 104 is switched in.

Each output channel 118, 118' is depicted with connected fixture control modules 120, 120' respectively. Each of the fixture control modules 120, 120' are depicted with LED light fixtures 122, 122' connected to them respectively. The fixture control modules 120, 120' are provided to receive power (48V DC) and control data for use in controlling the LED light fixture 122, 122' it is associated with. As described previously, if CAT 5/5E/6 low voltage cabling is used, three pairs of the wires could be connected in parallel to transmit power while one pair is used to transmit control and command information. Alternatively, it is contemplated that wireless control could be used if desired.

The power monitoring circuit is shown connected to computer 124. This computer could be remotely located from the digital power module 101 and the connection could be a network connection. For example, digital power modules could be distributed throughout a building. If one of the power supplies fails in one of the digital power modules, the power monitoring circuit can determine what has failed, can monitor the voltage output of the power supply in question, and can transmit various data to the computer 124. This may be provided as an alert to the computer 124, which would inform maintenance personnel of the type of failure, the location of the fixture control module 101, information about the failure and identify which power supply is in an alert status. In this way, maintenance personnel are provided with a wealth of information prior to inspecting the digital power module that sent the alert.

It is further contemplated that computer 124 can be used to send command signals to the fixture control modules and/or DPM, which could be used to potentially clear an alert. For example, the computer 124 could be used to restart the system or could be used to run a diagnostic. All this information can be collected and transmitted to the computer 124 for analysis. It is still further contemplated that power monitoring circuit 108 may comprise a memory or storage that can be used to collect data for transmission, for example, regular diagnostic data. Additionally, if control input is lost to the digital power module 101, the memory could provide preprogrammed control of the various fixture control modules and an alert could be transmitted to computer 124. Still further, computer 124 could provide control input as a backup in the event that the control input from the wall dimmer or other is lost. This could comprise, for example, manually setting the illumination level and color of the various LED light fixtures.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A power supply system for low voltage lighting comprising:
    a digital power module including:
    a power input adapted to receive an AC voltage;
    first and second power output channels each adapted to transmit a DC voltage;
    first and second primary power supplies each having an output adapted to generate a DC voltage;
    a spare power supply having an output adapted to generate a DC voltage;
    a first power transfer switch having a control input and a first set of contacts, the first set of contacts being coupled to the output of the first primary power supply, the output of the spare power supply and the first power output channel;
    wherein when DC power is provided to the control input of the first power transfer switch, the first set of contacts function to connect the output of the first primary power supply to the first power output channel, and when DC power is not provided to the control input of the first power transfer switch, the first set of contacts function to connect the output of the spare power supply to the first power output channel;
    a second power transfer switch having a control input and a second set of contacts, the second set of contacts being coupled to the output of the second primary power supply, the output of the spare power supply and the second power output channel;
    wherein when DC power is provided to the control input of the second power transfer switch, the second set of contacts function to connect the output of the second primary power supply to the second power output channel, and wherein when DC power is not provided to the control input of the second power transfer switch, the second set of contacts function to connect the output of the spare power supply to the second power output channel;
    a power monitoring circuit positioned in the digital power module, said power monitoring circuit measuring the DC voltage generated by the first primary power supply and the second primary power supply; and
    a processor coupled to said power monitoring circuit.

2. The power supply system according to claim 1, further comprising a voltage regulator coupled to the processor.

3. The power supply system according to claim 2, further comprising:
    a first diode coupled between the first primary power supply output and said voltage regulator;
    a second diode coupled between the second primary power supply output and said voltage regulator; and
    a third diode coupled between the spare primary power supply output and said voltage regulator.

4. The power supply system according to claim 1, wherein the first and second power transfer switches each comprise a single-pole double-throw (SPDT) relay.

5. The power supply system according to claim 1, further comprising:
    a first fixture control module coupled to the first output channel; and
    a second fixture control module coupled to the second output channel.

6. The power supply system according to claim 5, further comprising:
    a first LED light fixture coupled to said first fixture control module; and
    a second LED light fixture coupled to said second fixture control module.

7. The power supply system according to claim 6, wherein said digital power module further comprises a control input adapted to receive a control signal.

8. The power supply system according to claim 7, wherein each of said first and second fixture control modules is adapted to receive control signals from said digital power module for controlling said first and second LED light fixtures respectively.

9. The power supply system according to claim 1, wherein an alert is generated if the measured DC voltage fails to reach a threshold value; and the alert includes data relating to the cause for alert and transmitted to a remote computer.

10. A method for providing power for a low voltage lighting system, the method comprising the steps of:
- connecting an AC voltage to a power input of a digital power module;
- generating a DC voltage with a first primary power supply;
- generating a DC voltage with a second primary power supply;
- generating a DC voltage with a spare power supply;
- connecting the DC voltage generated by the first primary power supply to a first contact of a first power transfer switch;
- connecting the DC voltage generated by the spare power supply to a second contact of the first power transfer switch;
- connecting a common contact of the first power transfer switch to a first output channel;
- connecting an output of the first primary power supply to a control input of the first power transfer switch;
- actuating the first power transfer switch to close between the first primary power supply and the first output channel when DC power is provided to the control input of the first power transfer switch;
- actuating the first power transfer switch to close between the spare power supply and the first output channel when no DC power is provided to the control input of the first power transfer switch;
- connecting the DC voltage generated by the second primary power supply to a first contact of a second power transfer switch;
- connecting the DC voltage generated by the spare power supply to a second contact of the second power transfer switch;
- connecting a common contact of the second power transfer switch to a second output channel;
- connecting an output of the second primary power supply to a control input of the second power transfer switch;
- actuating the second power transfer switch to close between the second primary power supply and the second output channel when DC power is provided to the control input of the second power transfer switch;
- actuating the second power transfer switch to close between the spare power supply and the second output channel when no DC power is provided to the control input of the second power transfer switch;
- measuring the DC voltage generated by the first primary power supply and the second primary power supply with a power monitoring circuit.

11. The method according to claim 10, further comprising the steps of:
- connecting a first fixture control module to the first output channel;
- connecting a first LED light fixture to the first fixture control module;
- connecting a second fixture control module to the second output channel;
- connecting a second LED light fixture to the second fixture control module;
- receiving a control input by the digital power module;
- transmitting a first control signal to the first fixture control module to control the first LED light fixture; and
- transmitting a second control signal to the second fixture control module to control the second LED light fixture.

12. The method according to claim 10 wherein an alert is generated if the measured DC voltage fails to reach a threshold value; and the alert includes data relating to the cause for alert and is transmitted to a remote computer.

13. The method according to claim 10, wherein the first and second power transfer switches each comprise a single-pole double-throw (SPDT) relay.

* * * * *